J. G. ROBERTS.
REGISTERING AND RECORDING DEVICE.
APPLICATION FILED DEC. 30, 1916.
1,276,570.
Patented Aug. 20, 1918.
9 SHEETS—SHEET 7.
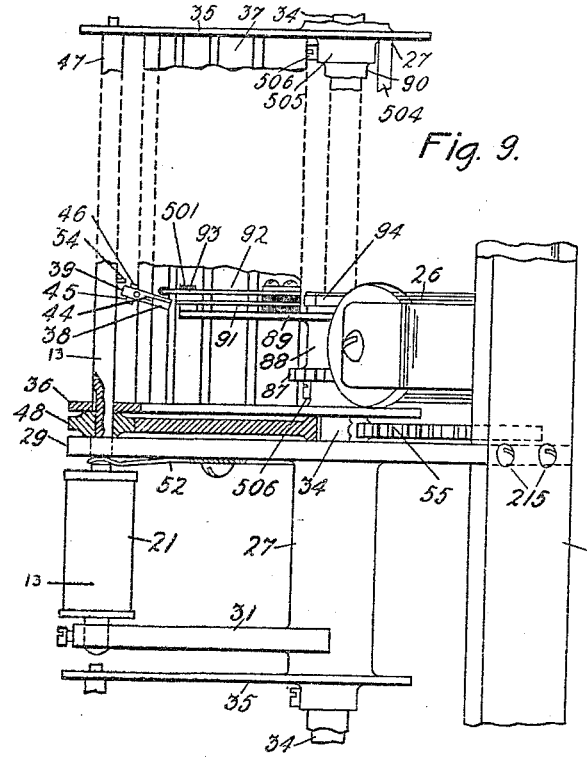
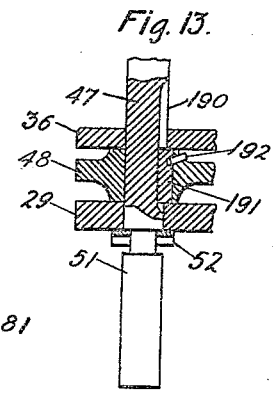
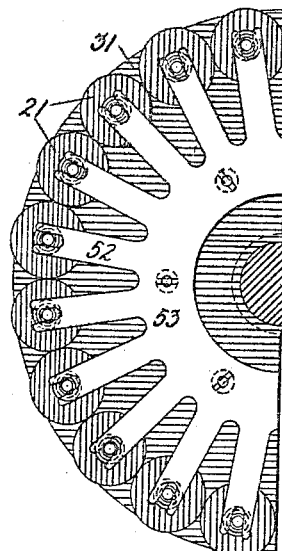
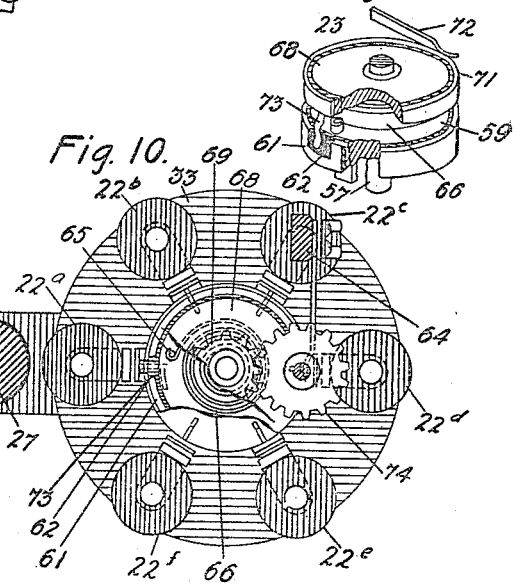
Inventor:
John G. Roberts.
by Howard M. Cross
Att'y

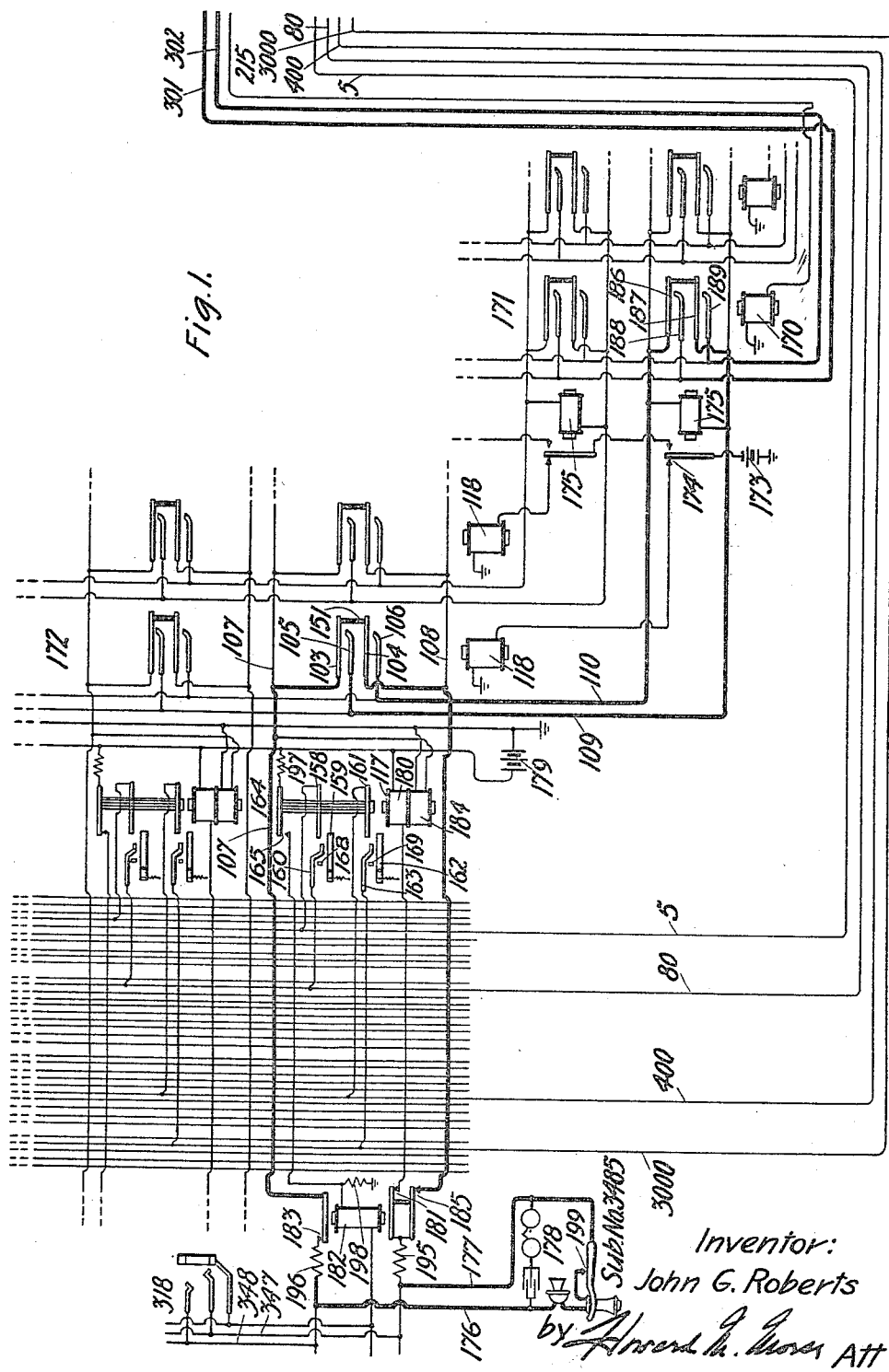

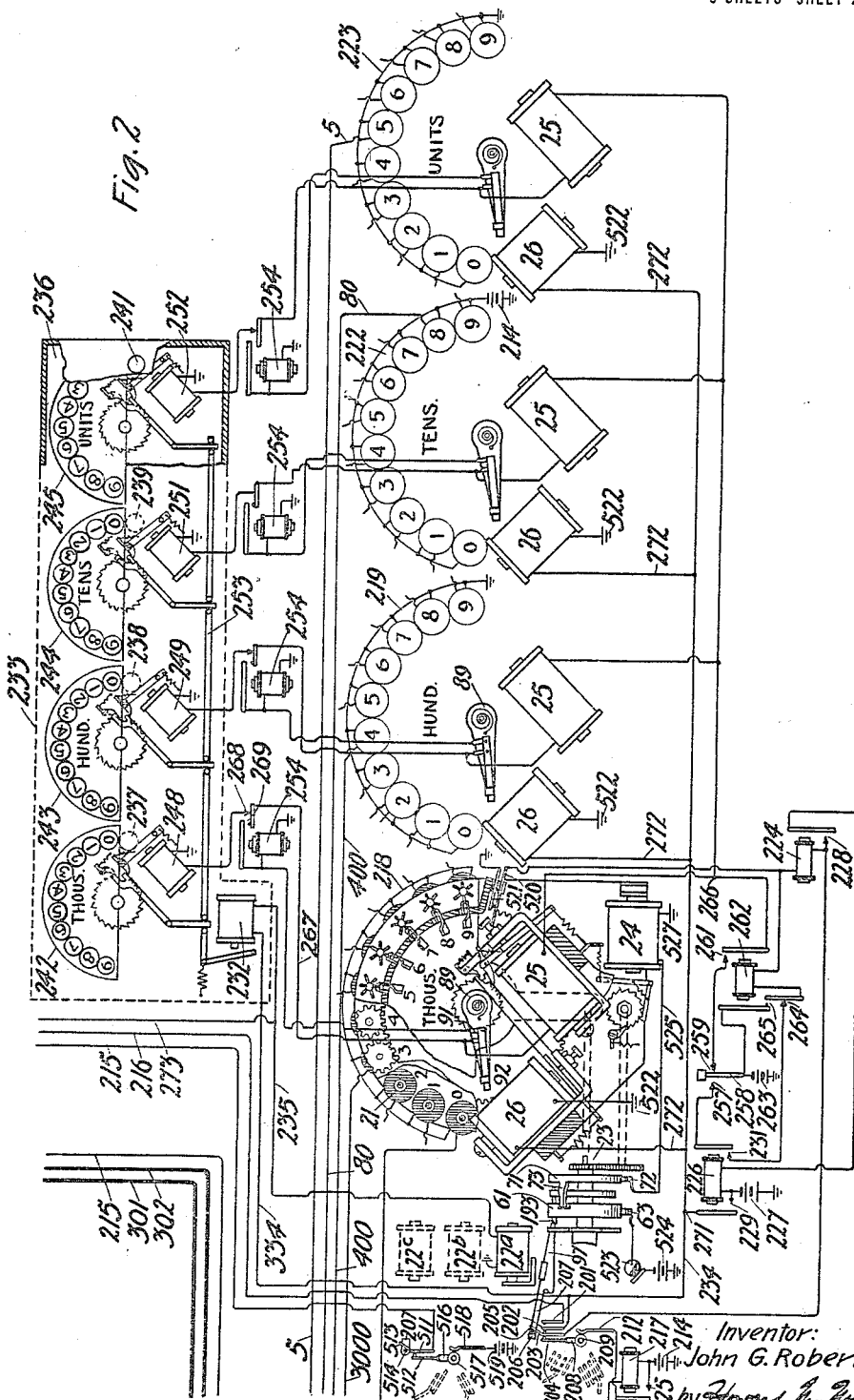

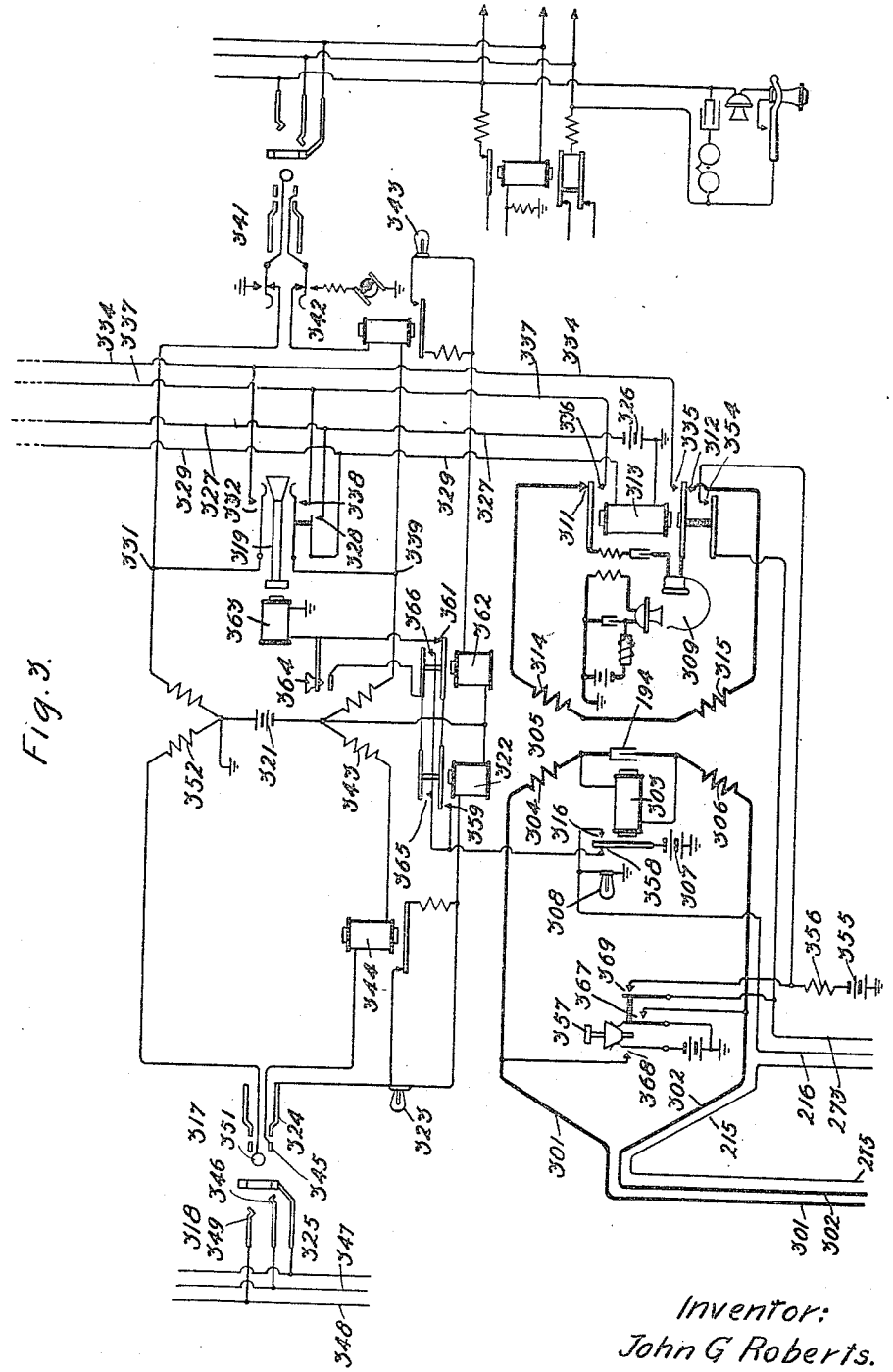

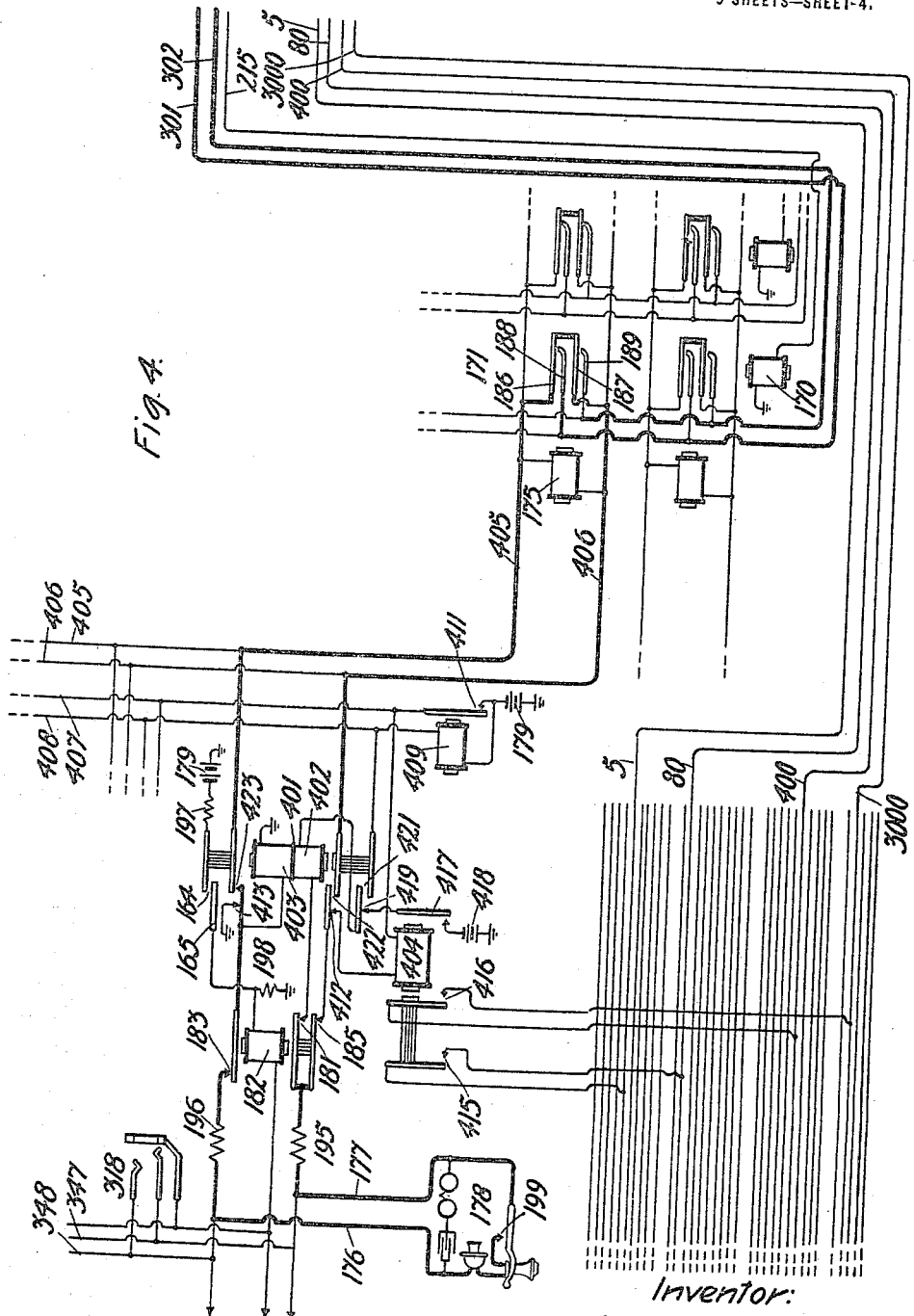

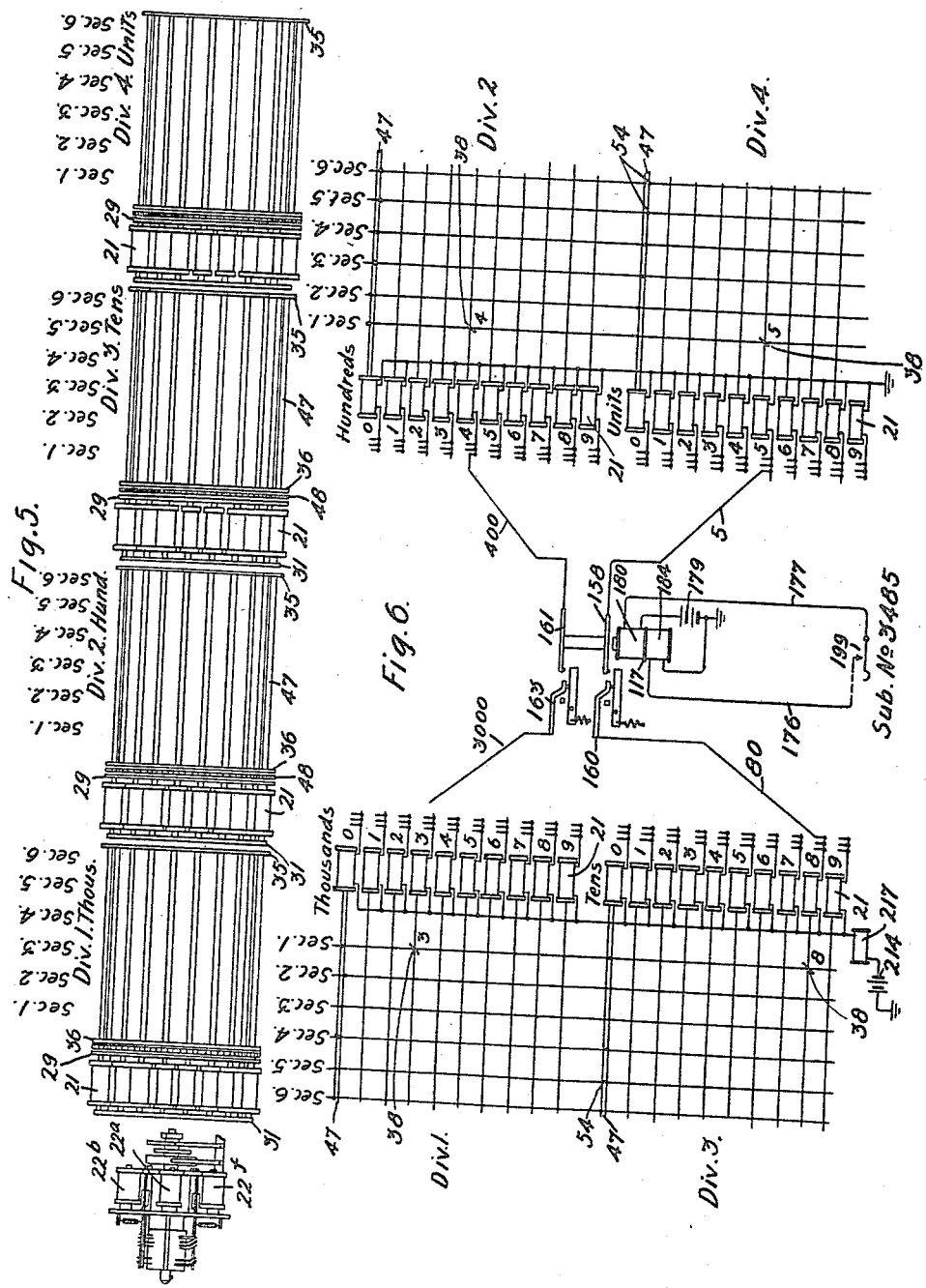

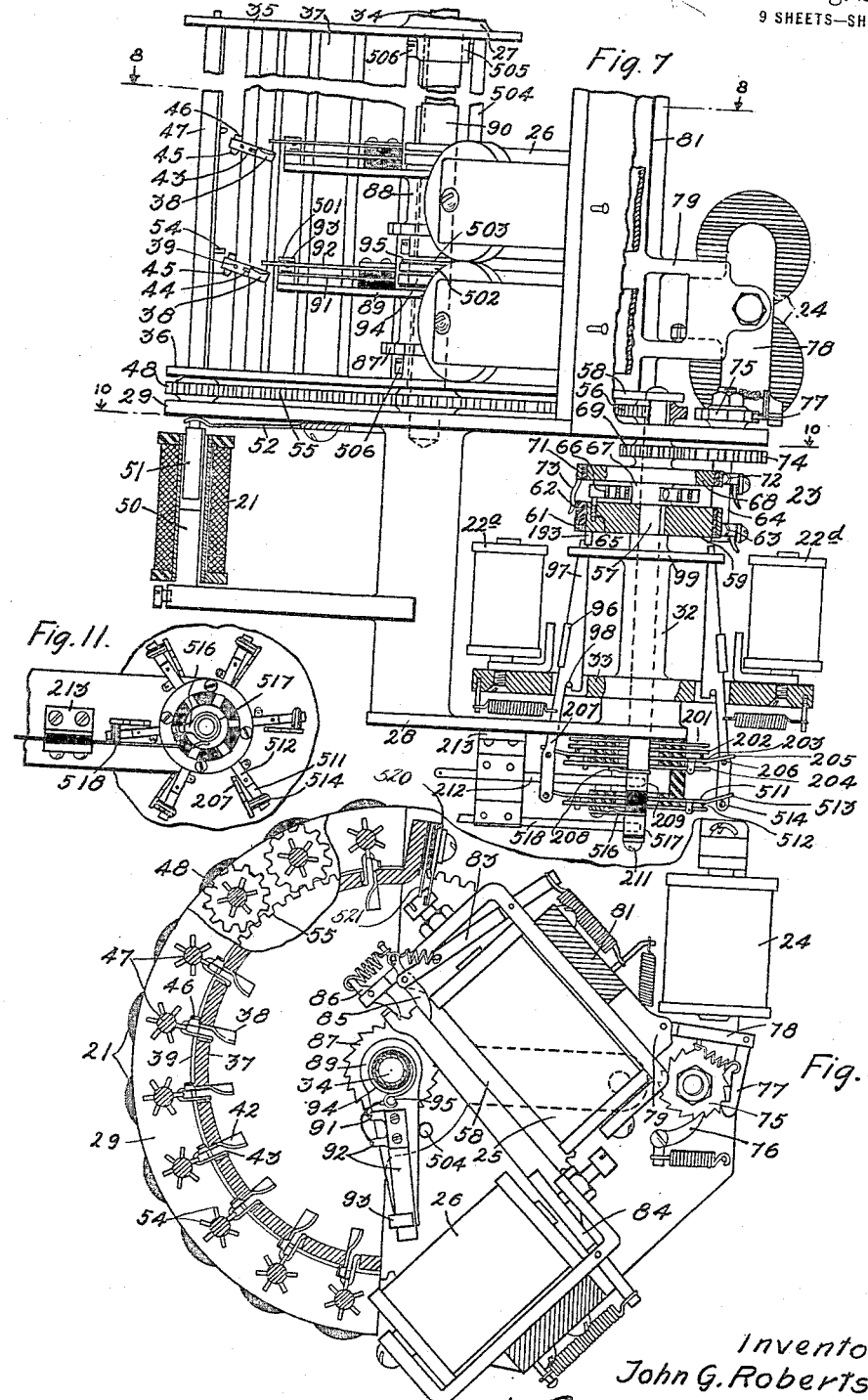

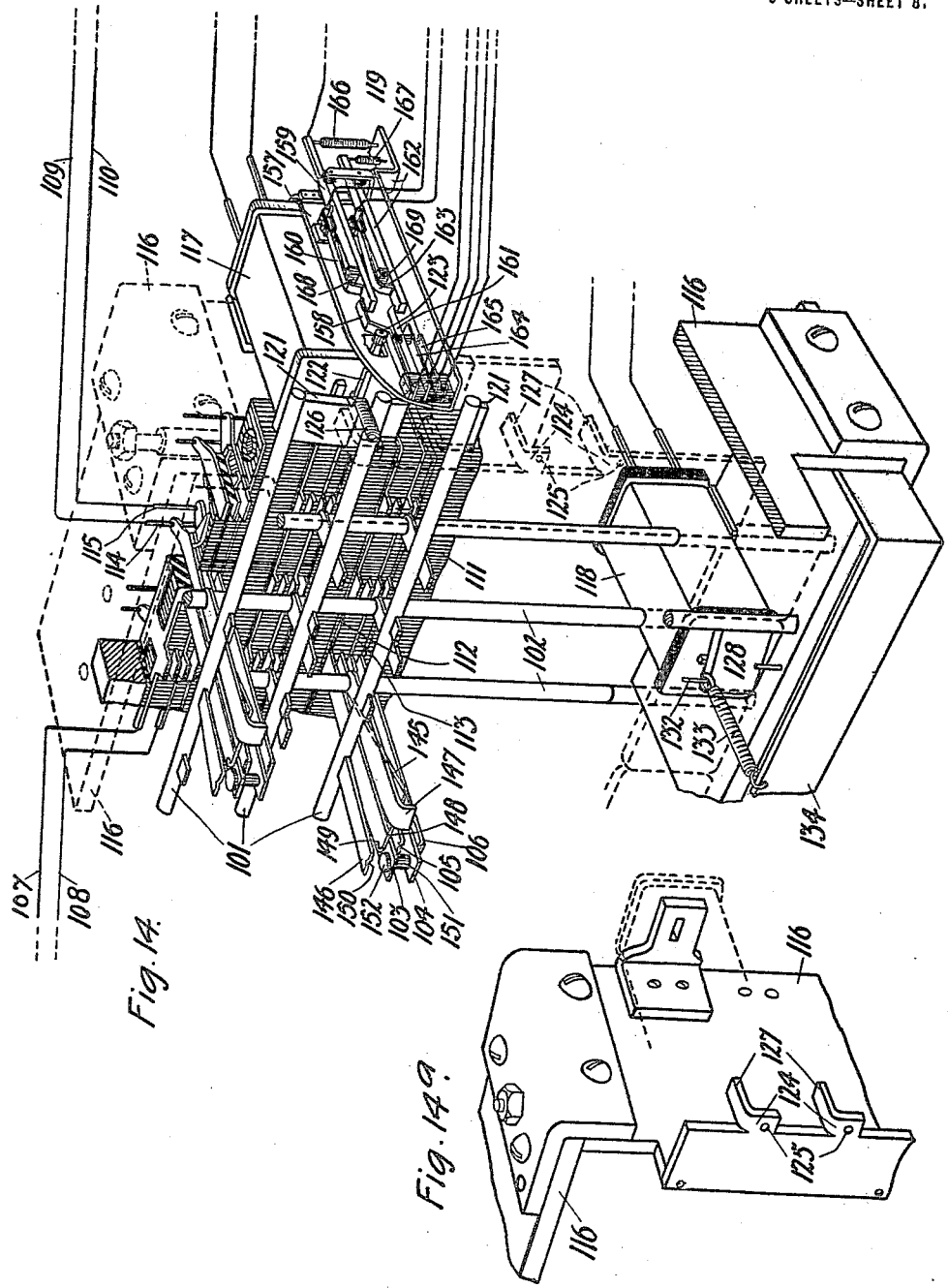

J. G. ROBERTS.
REGISTERING AND RECORDING DEVICE.
APPLICATION FILED DEC. 30, 1916.

1,276,570.

Patented Aug. 20, 1918.
9 SHEETS—SHEET 9.

Inventor:
John G. Roberts.
by: Howard G. Moss
Att'y

UNITED STATES PATENT OFFICE.

JOHN G. ROBERTS, OF DOBBS FERRY, NEW YORK, ASSIGNOR TO WESTERN ELECTRIC COMPANY, INCORPORATED, OF NEW YORK, N. Y., A CORPORATION OF NEW YORK.

REGISTERING AND RECORDING DEVICE.

1,276,570.

Specification of Letters Patent. Patented Aug. 20, 1918.

Original application filed March 7, 1914, Serial No. 823,094. Divided and this application filed December 30, 1916. Serial No. 139,816.

*To all whom it may concern:*

Be it known that I, JOHN G. ROBERTS, a citizen of the United States, residing at Dobbs Ferry, in the county of Westchester and State of New York, have invented certain new and useful Improvements in Registering and Recording Devices, of which the following is a full, clear, concise, and exact description.

This invention relates to registering and recording devices and particularly to recording devices applicable to telephone exchange systems. The present is a division of application, Serial No. 823,094, filed March 7, 1914 which matured into Patent #1,218,805 issued March 13, 1917.

The object of this invention is to provide a simple and efficient mechanism for the rapid recording at the central office of subscribers' line numbers.

One feature of the invention resides in a sectional call-recording mechanism. The several sections of this mechanism are provided each with a plurality of similarly located recording members, and the recorded as a whole is provided with a plurality of actuating devices equal in number, preferably, to the recording members in each section. Each actuating device is, moreover, operative with respect not only to some one or more of the recording members of one section, but also to the recording members correspondingly located in the other sections. By this mechanism the numbers of subscribers' lines are automatically registered one after another in the several sections thereof, and means is provided for automatically shifting in unison all of the actuating devices so that they are operatively associated with the recording members in the several sections in rapid succession as the calls are received.

The call-recording mechanism heretofore referred to is preferably used in an automatic call-distributing system whereby at the moment a subscriber is calling the recording mechanism receives and records the number of the line calling, while at the same time the line is automatically and instantly connected to an idle call-receiving apparatus. Each section of the recording mechanism is associated with a particular call-receiving apparatus. The two operations mentioned, which, as stated, take place simultaneously at the moment the calling subscriber lifts his receiving telephone to initiate a call, are followed immediately by a shifting movement of the actuating devices of the call-recording mechanism, which prepares the next idle section thereof and the corresponding call-receiving apparatus for receiving the next call. Whenever any calling line number is thus recorded and the line thus extended, that number may be made manifest in any desired manner at the location of the corresponding call-receiving apparatus. For example, in the semi-automatic system each call-receiving apparatus would be associated with an operator's position, and the number of the line would be made manifest, if desired, by means of a visual register displayed at that operator's position. The actuation of the visual register if used may be made very rapid but it is not necessarily instantaneous. The registration may be accomplished by suitable step-by-step mechanism acting after the call is received by the recorder and after the shifting operation has taken place to provide for subsequent calls.

Briefly stated the operation of the system is as follows: As the subscribers' calls come in their lines are distributed and instantly connected to different idle call-receiving apparatus, and their numbers are simultaneously and instantly recorded on corresponding sections of the recording mechanism. A shifting operation takes place immediately after each call is received to prepare the next idle call-receiving apparatus and the corresponding section of the recording mechanism for the next call. Any one call-receiving apparatus and its corresponding section of the recording mechanism are retained in use by a calling line for a brief time only, this time being merely that required to set up a telephonic circuit through suitable switching mechanism between the calling line and the line wanted. In a manual or a semi-automatic telephone system constructed according to this invention, the calling subscriber may immediately upon lifting his receiving telephone dictate to the operator the number of the wanted subscriber, and the operator, noting that number orally and noting the number of the calling subscriber visually on the calling line number register, may by any suitable switching mechanism connect the two lines together for telephonic communication, whereupon the original instruction circuit and the calling line number recorder and register, being of no further use for that call, are restored to common use and thus made ready for subsequent calls. In the system described in this application the switching means for setting up a telephonic circuit between the subscriber is the usual cord circuit of a manual switchboard system. It is apparent, however, that the invention is of broad scope and can be utilized in other telephone systems using other forms of connecting circuits and switching apparatus.

The particular embodiment of the invention herein described will be understood by reference to the accompanying drawings wherein—

Figures 1, 2 and 3, when placed with Fig. 3 above and Fig. 1 to the left of Fig. 2, are illustrative of a system of circuits and apparatus;

Fig. 4 illustrates an alternative circuit arrangement to that of Fig. 1;

Fig. 5 is a pictorial view of a four-division recording device;

Fig. 6 is a simplified circuit diagram illustrating the principle of the subscriber's control of the call recorder;

Fig. 7 is a view in elevation of the first or lowermost division of the recorder, certain parts being shown broken away and other parts in section.

Fig. 8 is a plan view of the same shown in section along the line 8—8 of Fig. 7 with a part of the frame broken away;

Fig. 9 is a view in elevation of one of the divisions of the recorder other than the first;

Fig. 10 is a plan in section of the recorder along lines 10—10 of Fig. 7 with a part broken away;

Fig. 11 is a detail of a commutator forming part of the recorder;

Fig. 12 is a perspective view of a spring motor, which forms part of the recorder, a part being broken away;

Fig. 13 is a detail cross-sectional view of a pinion and rod along the line 13—13, Fig. 9;

Fig. 14 is a perspective and fragmentary view showing the construction details of an automatic line switch adapted for extending a calling line to an idle receiving apparatus; Fig. 14ᴬ is a perspective view of a portion of the supporting frame of the automatic line switch.

Figure 15:
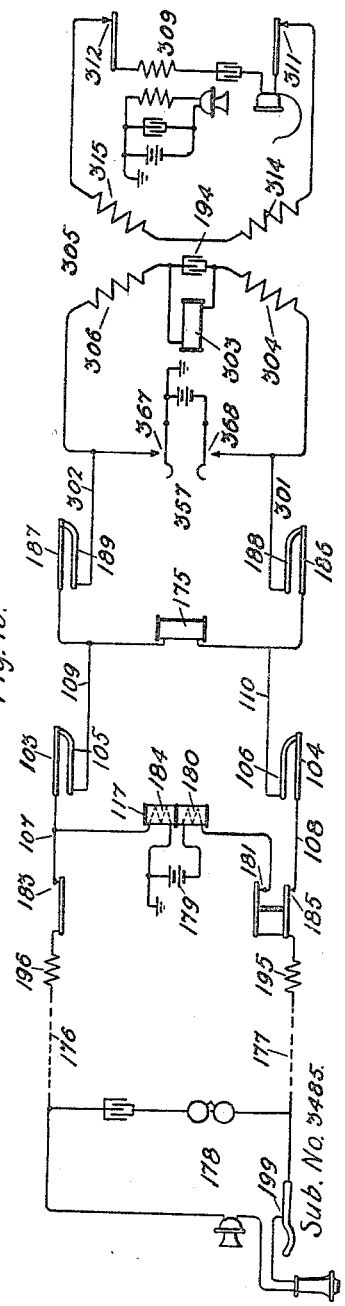
Figs. 15 and 16 are simplified diagrams of the circuits established for telephonic communication.

The recording system in general.

The purpose of the recording mechanism is to make temporary note of subscribers' line numbers. It is not essential that the number be visually registered by this mechanism, but merely that some record be impressed upon it which can be temporarily retained and be translated or ascertained or made use of in some way or another. In the present application the recording mechanism is shown applied to a call-distributing system in such a way that it records the numbers of the calling lines. In my Patent #1,201,504 issued October 17, 1916, a similar mechanism is shown as applied to the recording of numbers of the lines wanted. The operation of this mechanism in the present system is instantaneous or practically so, that is to say, the record of the several numerals of a calling subscriber's line number takes place at the moment the subscriber, in lifting his telephone receiver from its switchhook, closes his line circuit.

In large telephone exchange systems it is usual to divide the equipment into a number of offices, each office having a capacity of 10,000 subscribers' lines, and in such a system the number of each subscriber's line, other than the character or number indicating the office, comprises four numerals. A calling line number recorder for such an office would have four divisions (see Fig. 5), one for each order of numerals of the subscribers' numbers; Div. 1 being for the thousands numerals, Div. 2 for the hundreds, Div. 3 for the tens, and Div. 4 for the units. In order that a plurality of calls, which may come into the office in rapid succession, may be recorded and the several records maintained for a sufficient length of time to permit their being utilized or made note of, the recording mechanism is divided into as many sections as the traffic requires. In fact, each of the four divisions is divided into the required number of sections. Six such sections are provided in the recording mechanism shown in Fig. 5.

As will appear hereinafter from the detail description and statement of operation, any calling subscriber's number, say No. 3485, would be recorded at some one section, say section 1, by indicating the thousands numeral 3 in section 1 of Div. 1; the hundreds numeral 4 in section 1 of Div. 2; the tens numeral 8 in section 1 of Div. 3, and the units numeral 5 in section 1 of Div. 4. Means is provided whereby upon the number being recorded in section 1, the control of the actuating members of the recorder is at once shifted by a common motor mechanism, shown at the left end of Fig. 5, so that these members will operate to record the next succeeding call in section 2, or in case section 2 already contains a recorded call not yet utilized or made note of, in the next idle section.

The general system of circuits for controlling the operation of the recorder, when applied to the recording of calling subscribers' numbers in an office of 10,000 lines, may be briefly explained by reference to Fig. 6, wherein the recording points, 240 in all (sixty in each of the four divisions), are arbitrarily arranged in a manner to facilitate the explanation. Each division has ten controlling magnets 21, one for each of the numerals 0 to 9, and therefore forty such magnets in all. Each magnet controls an arm or shaft 47 operative at six recording points, one in each of the six sections. All of the forty magnets are at any one time operative in some one section only, say section No. 1. Twenty of these magnets, those of the thousands and tens groups, have each one coil terminal connected through the coil of a central magnet 217, common to the recorder, to one pole of a battery 214, while the other twenty magnets, those of the hundreds and units groups, have each one coil terminal connected to the other pole of the battery 214 which may be ground. The opposite coil terminals of all of the forty magnets are connected each to an individual busbar or wire to which various branches lead to contact points of subscribers' line relays 117. There is associated with each subscriber's line one such line relay adapted to be energized upon closure of the line circuit at the hook switch contact 199 when the subscriber is calling. Relay 117 has two sets of normally open contacts 160, 158 and 163, 161. It will be noticed that in Fig. 6 the four contact points 160, 158, 163 and 161 are shown as connected respectively to the busbars of the following recording magnets: No. 3 of the thousands group, No. 4 of the hundreds group, No. 8 of the tens group, and No. 5 of the units group, these numbers corresponding to the four numerals of the subscriber's line number 3485. The operation, briefly stated with reference to Fig. 6, is as follows: When the subscriber lifts his receiver to call, the relay 117 is energized over a circuit including the central office battery 179, the two windings 180 and 184 of the relay 117, the subscriber's line wires 176 and 177, and the switchhook contact 199, and by reason of the pass-by or "make before break" contact arrangement of this relay, two local circuits are momentarily closed: one including ground, hundreds magnet No. 4, branch wire 400, relay contacts 161, 163, branch wire 3000, thousands magnet No. 3, control magnet 217 and battery 214; the other including ground, units magnet No. 5, branch wire 5, relay contacts 158, 160, branch wire 80, tens magnet No. 8, control magnet 217 and battery 214. This results in an indication by some suitable means, such as the displacement of small levers 38 (see Figs. 7 and 8) of the numerals 3, 4, 8 and 5 in sections 1 of divisions 1, 2, 3 and 4, respectively, of the recorder. The manner of indicating this number 3485 in section 1 of the recorder is graphically indicated by the short diagonal lines representing displaced levers 38 in Fig. 6. At the moment this recorder is established in section 1, the control magnet 217 is energized and sets into operation the mechanism (the shafts 47) for transferring the control of the actuated members of all the recording magnets 21 to the next idle section.

The rule with respect to the connection of the contact points of the line relay 117 to the busbars of the recording magnets may be stated as follows: the contact points 163, 161, 160 and 158 of each line relay are connected to the busbars of the particular recording magnets in the thousands, hundreds, tens and units groups, the numbers of which correspond to the thousands, hundreds, tens and units numerals respectively of the subscriber's line number. Applying this rule again, for example, to subscriber whose line number is 8903, the contact 163 of his line relay 117 would be connected to magnet No. 8 of the thousands group, contact 161 to magnet No. 9 of the hundreds group, contact 160 to the magnet No. 0 of the tens group, and contact 158 to magnet No. 3 of the units group. It will be seen, therefore, that by this simple arrangement, a single set of forty recording magnets will serve 10,000 subscribers and successively record their line numbers as fast as they initiate calls to the central office.

*The recording mechanism.*

A form of mechanism suitable for recording the numbers of calling subscribers' lines is shown in detail in Figs. 5 and 7 to 12 inclusive. It comprises among other devices, the recording electromagnets 21 (shown also in Fig. 6), ten in number and designated 0 to 9 in each division, or forty in all; a series of stop electromagnets 22, six in number, one for each section and designated 22ª to 22ᶠ inclusive; a spring motor device 23; an electromagnet 24 for winding the spring of the motor, and pairs of stepping and releasing magnets 25, 26, six of these pairs being located in each division (one in each section thereof) or 24 pairs in all.

The various electromagnets mentioned and the devices associated therewith and controlled thereby are supported upon a frame which comprises four main trunk members 27, centrally located in line with each other, one below each division of the recorder. To the lower end of the lowermost trunk 27 is fixed a base plate 28 and at the upper end of each trunk 27 is a plate 29. A semi-circular plate 31 is attached to each trunk 27 and supports ten of the electromagnets 21. Extending upwardly from the base plate 28 and parallel to the lowermost trunk 27 is a post 32. This post supports a circular plate 33 on which the six electromagnets 22$^a$ to 22$^f$ are mounted; it also supports at its upper end the spring motor device 23.

Projecting upwardly from the top of the lowermost trunk 27 and having a bearing therein is a shaft 34. This shaft extends through the four divisions of the recorder and has a bearing in each of the trunks 27. At the lower end of each division, slightly above the plates 29, is a plate 36, and at the upper end thereof a plate 35. Held between plates 35 and 36, and arranged in semi-cylindrical grid formation, is a series of segmental bars 37. These bars lie parallel to the shaft 34, are equally distant therefrom, and are separated from each other sufficiently to provide spaces therebetween for the pivoted recording levers 38.

There are ten of these levers for each section of each division; therefore, sixty in each division and 240 in all. These levers correspond to and are in fact the 240 recording points indicated in the diagram, Fig. 6. The ten levers in each section of each division are arranged in a semi-circle and point radially toward the shaft. They are held in place by and pivoted to the wires 39 which are drawn taut across the bars 37. There is one pivot wire 39 for the ten levers 38 in each section of each division or 24 in all.

Each of the pivoted recording levers 38 is formed of a thin piece of spring metal bent into a J shape, one arm 42 thereof being longer than the other arm 43. The lever thus formed is sprung into its place in the space between the bars 37 and its two arms bear with slight pressure against the inside edges of these bars. The longer arm 42 extends inwardly beyond the inside surface of the bars 37, and is twisted to about 45 degrees. The purpose of the twist, which is more fully explained hereinafter, is to facilitate the restoration of the levers to normal position after being displaced to record a numeral of a subscriber's line number. The shorter arm 43 of the lever is formed with a slight projection 44 to frictionally engage the edge of the adjacent bar 37. Two small ears 45 and 46 project laterally from the longer arm and engage the outside surface of the adjacent bar 37 in order to limit the rocking movement of the lever on its pivot.

Extending between and having bearings in the plates 35 and 36 is a series of shafts 47, ten in number in each division or 40 in all. Each of these shafts is in line with one of the electromagnets 21, and each is capable of a limited endwise movement through the plates 35 and 36 and also through a pinion 48 and the plate 29. At the end of each shaft 47 below the plate 29 is an armature or plunger 51, which is integral with the rod and is adapted to be attracted to the core 50 of the electromagnet 21.

The shaft 47 (see Fig. 13) is provided with a longitudinal slot or keyway 190 in which a key 191 is inserted. This key is attached to the pinion by means of a rivet 192 in order that the shaft 47 may be given a turning movement by the pinion without displacing the pinion. Normally the shaft 47 is retained in the position shown in Figs. 7 and 8 by a retaining spring 52, which forms one of the arms of a spider 53. A series of six pins 54 are radially attached to each shaft 47 and positioned therein spirally so that in six equal angular movements of the shaft, these six pins will be respectively brought successively into operative position with respect to the six levers 38 in line therewith in the several sections of the recorder. In any one of its six positions, the shaft 47 will place one of the pins 54 adjacent the upper end of a lever 38. Then upon the energization of the corresponding electromagnet 21, this shaft will be displaced endwise, bringing the pin into engagement with the lever and rocking the latter so that its outer end will slant upwardly instead of downwardly.

All of the ten pinions 48 which are in each division of the recorder are engaged by a gear wheel 55 keyed to the shaft 34 between the plates 36 and 29. A pinion 56 engages the gear wheel 55 in the first division and thus drives in unison the shaft 34, the four gears 55 and the forty pinions 48. This pinion 56 is keyed to a shaft 57 bearing in an extension piece 58 of the plate 36; and also in the plate 29 and in the stem 32. There is keyed to this shaft a disk 59 on the periphery of which and insulated therefrom is a contact ring 61 covering the whole surface of the disk, except a small section 62 which is of insulating material. A contact brush 63 supported on an arm 64 of the frame, but insulated therefrom, bears upon the contact ring 61. Fastened to the disk 59 is a stop pin 193, the function of which will be presently explained. A pin 65 also secured to this disk supports the outer end of a spiral spring 66. The inner end of this spiral spring is fastened to a hub 67 which is integral with a disk 68 and a pinion 69. The hub 67, disk 68 and pinion are adapted to turn freely and together on the shaft 57 as a bearing. On the outer surface of the disk 68 is a contact ring 71 against which a contact brush 72 bears.

This contact brush is fastened to the arm 64 of the frame and like contact brush 63 is insulated therefrom. The contact ring 71 carries a brush 73 which normally rests on the periphery of the disk 59 at the insulating section 62 thereof. Engaging the pinion 69 is a small gear 74 which is fixed to a short shaft extending through the plate 29 and supporting on the other side of the plate a ratchet wheel 75. This ratchet wheel is provided with a retaining pawl 76 and a driving pawl 77, the latter being pivoted to the armature 78 of the magnet 24. Armature 78 is pivoted to an extension piece 79 of a bar 81. This bar is a part of the frame, extends the whole length of the mechanism and is fastened by screws 215 to the plates 29 in each division.

Each pair of magnets 25, 26 with their armatures 83 and 84 respectively, together with the stepping and retaining pawls 85 and 86 comprise a step-by-step mechanism for advancing and releasing a ratchet wheel 87. There are twenty-four such ratchet wheels in the recorder, one for each section of each division. Each ratchet and its contact-carrying arm 89 are formed integrally with a hub 88 supported on a metal sleeve 90 which surrounds the shaft 34. The arm 89 carries a pair of contact springs 91 and 92, the latter resting normally against the insulating stud 501 attached to an angular extension 93 of the arm. The contact springs 91 and 92 are connected respectively to spiral conducting and retracting springs 94 and 502, the outer ends of which are fixed to an insulating pin 95 on the side of the arm 89, and the inner ends of which are secured to an insulating sleeve 503 on the metal sleeve 90.

The arm 89 is shown in Fig. 8 in its normal position resting against a rod 504, and in Figs. 7 and 9 in an off-normal position to show its position with respect to the levers 38 as it passes them. The sleeve 90 extends between the plates 35 and 36 and is fastened at each end in a hub 505 by set screws 506. The rod 504 also extends between and is supported by the plates 35 and 36.

Each of the six electromagnets 22 has an armature 96. A lever 97 to which the armature is secured is pivoted at 98 in a slot in the circular plate 33, and rests at its upper end in one of six peripheral slots in a circular plate 99 secured near the upper end of the stem 32. The lever 97 extends slightly above the plate 99 in position to be engaged by the pin 193 in the disk 59.

Underneath the base plate 28 of the frame are two groups of six sets of contact springs arranged radially about the lower end of the shaft 57 (see Fig. 11). In the group nearest plate 28, each set comprises contact springs 201, 202, 203 and 204. Springs 203 and 204 are normally in contact with each other while springs 201 and 202 are normally separated. An angular extension 205 of spring 203 is in position to be engaged by an insulating pin 206 carried by a lower extremity 207 of the lever 97. Carried by, but insulated from, shaft 57 are a brush 208 and a feed ring 209 and electrically connected with each other. Bearing on ring 209 is a contact brush 212 supported by, but insulated from, a bracket 213 attached to plate 28. In the lower group of contacts each set comprises contact springs 511 and 512 normally in contact with each other. An angular extension 513 of spring 511 is in position to be engaged by a second insulating pin 514 carried by the lower extremity 207. A brush 516 and feed ring 517 are carried by, but insulated from, the shaft 57 and electrically connected with each other. Brush 208, ring 209, brush 516 and ring 517 are secured rigidly on shaft 57 by means of screw 211. Bearing on ring 517 is a contact brush 518 supported by, but insulated from, bracket 213.

The arrangement for the operation of these sets of contacts is such that each of the magnets 22 controls one set of springs in each of the two groups, and when its armature 96 is attracted the insulating pins 206 and 514 engage, respectively, extensions 205 and 513 and thereby open the contact between springs 203 and 204 and between springs 511 and 512 and close the contact between springs 201 and 202. The brushes 212 and 518 serve to conduct current to the two brushes 208 and 516, respectively, in any position of the latter two, which make contact, in six angular positions, with six springs 204 and 512, respectively.

A constant force is exerted on the disk 59 by means of the spring 66, tending to rotate it on the shaft 57, but normally the disk is prevented from rotating by the engagement of the pin 60 with the end of the lever 97 of one of the six electromagnets 22. When this lever is withdrawn, however, the disk moves forward with a snap until the pin strikes the next lever 97 that is in normal position. This carries the contact ring on the disk 59 beyond the point where the brush 73 rests on the insulating segment 62 and a circuit (which will be described hereinafter in connection with Fig. 2) is closed which energizes intermittently the electromagnet 24. This magnet thereupon oscillates its armature causing its pawl 77 to drive the ratchet wheel 75 and step around the gear wheel 74. The latter, by engagement with the pinion 69, drives the disk 68 up to the point where the brush 75 again rests on the insulating segment 62. In this manner the spring 66 is kept wound up so that the disk 59 is always caused to advance to a new position when the lever holding it is withdrawn.

When the disk 59 is advanced one step in the manner stated, the pinion 56 drives the gear wheel 55 in the first division. This and the other gear wheels 55 in the several divisions are keyed to the shaft 34 so that the forty pinions 48 are all rotated an angular distance of 60°. This causes a corresponding movement of each of the rods 47 and brings a new set of pins 54 into operative position with respect to the levers 38. The recorder is thus by a single quick movement advanced so that the control of the magnets 21 is shifted almost instantly from one section to another.

The functions of the rotatable arm 89 are to locate and to restore any displaced lever in its line of travel. When a subscriber's line number is registered by the displacement of four levers in some section of the recorder, the four arms 89 in that section may be stepped around. In passing the displaced lever the spring 92 will engage the lower side of the twisted end 44 and be forced in contact with the spring 91. The number of steps taken before this contact is made is the measure of the position or the number of the lever displaced. After passing by the displaced lever the arm is restored and the spring 92 again engages the end 44, but this time on the reverse side, and as the spring 92 is prevented from flexing upwardly by the extension 93, the lever is restored to normal position. The arm 89 may be stepped by all of the ten levers in every case and by an extra or eleventh step to a spring 520, causing it to break contact with a spring 521. This, as will be presently explained, may bring about the restoration of the arm 89.

*The automatic switch.*

A form of automatic switch suitable for distributing and connecting the lines of calling subscribers to the preselected idle call receiving apparatus or operator's telephone is shown in Fig. 14. This switch is, of itself, the subject-matter of my Patent #1,143,998, issued June 22, 1915. As will appear from the following description, this switch is capable of distributing one after another the calls from a plurality of "incoming circuits," such as subscribers' lines, to a lesser number of "outgoing circuits", such as operators' circuits.

Referring to Fig. 14, 101, 101, 101, are incoming line shafts extending horizontally, and 102, 102, 102 intersecting outgoing line shafts extending vertically. At or adjacent each intersecting point is a set of contact springs 103, 104, 105 and 106, 103 and 104 being terminals of an incoming line 107, 108 and 105 and 106 of an outgoing line 109 and 110. These spring terminals are mounted rigidly in a frame 111 at one side of the intersecting shafts, the springs 103 and 104 being connected in multiple with like springs of other contact sets in the same horizontal row by means of plates 112, 113, of which these springs are an integral part or with which they are in contact. The outgoing line springs 105, 106 are likewise connected in multiple with like springs of contact sets in the same vertical row, the connections in this case being made by wires 114, 115 soldered to the ends of the springs at the rear of the frame. The body of the frame may be of insulating material, as shown, and the contact springs held therein rigidly but insulated from one another except for the multiple connections before mentioned.

Surrounding the body of the frame are supporting strips 116 (indicated in part by dotted lines) provided with holes to form bearings for the shafts and formed in a manner to be presently described for supporting the electromagnets and their operating parts. Electromagnets 117 (one only being shown in Fig. 14 in full) are placed in vertical alinement along the side strip 116, while electromagnets 118 (also one only shown) are similarly arranged in horizontal alinement along the bottom strip 16. Each magnet may have an individual set of contact springs such as the set 119 for the magnet 117 mounted on a bracket 157.

Each of the shafts 101 extends through to the outside of the side strip 116 and carries an armature 121 for the magnet 117. An extension 122 of this armature carries a roller 123 which is in position to engage spring 158 when the armature is attracted. Fastened at one end to this extension 122 and at the other end to an extension 124 of the strip 116 through an opening 125 therein is a retractile spring 126 which normally holds the armature 121 away from the magnet core and against a stop formed by the inturned part 127 of the extension 124. The spring 158 when actuated makes contact with a pivoted contact bar 159 causing the latter to break contact with a spring 160. At the same time spring 161 makes contact with a pivoted contact bar 162 causing the latter to break contact with a spring 163 and also spring 164 makes contact with spring 165. The contact bars 159 and 162 are insulated from the bracket 157, to which they are pivoted, and are normally held by retractile springs 166 and 167 against insulating blocks 168 and 169, respectively. When the armature 121 is attracted the springs 158 and 163 follow the bars 159 and 162 a short distance but break contact therewith upon engagement with the blocks 168 and 169, respectively. The object of this arrangement is to provide for timed "pass by" circuit connections, one between the springs 158 and 160 by way of the bar 159, and the other between the springs 161 and 163 by way of the bar 162.

The lower end of each shaft 102 carries an armature 128 for the magnet 118. Extending upwardly from the armature 128 is a pin 132 to which one end of a reactile spring 133 is attached, the other end thereof being attached to a U-shaped strip 134 secured at each end to the side strips 116.

For operating each contact set 103, 104, 105 and 106 at the intersections of the shafts, there are provided two arms, one a flexible arm in the form of a spring wire 145 carried by shaft 102, and a rigid arm 146 attached to shaft 101. The arm 145 is protected from displacement by a rigid arm 147, the latter being directly attached to the shaft 102 and the former attached to the latter at a point near the shaft. The arm 147 is turned down at its free end over a right-angle extension 148 of the arm 145, and at the free end of this extension the arm or wire is formed in an upturned half loop 149, which is adapted to engage the recess 150 in the arm 146. The contact set 103, 104, 105, 106 carries a headed insulating plug 151 inserted in a hole near the end of spring 103, the head 152 resting on that spring and the lower end of the plug resting on spring 104.

The magnets 117 and 118 are controlled by the circuits shown in Figs. 1 to 4.

In the operation of this switch mechanism some one of the outgoing lines, such as 109, 110, will be prepared for subsequent connection to any incoming line. One of the magnets 118 is normally energized holding its armature attracted and its shaft 102 in angular displacement. Therefore, each of the flexible arms 145 carried by this shaft will be swung to the left bringing its half looped end 149 directly over the head 152 of the contact set and beneath the rigid arm 146 of the shaft 101. Upon the subsequent closure of one of the magnets 117 the lever will rock the corresponding shaft 101 causing the rigid arm 146 to descend upon the end 149 of the flexible arm 145, pushing the latter against the head 152 of the contact set located at the intersection of the two shafts 101 and 102 which have been displaced. In this manner the springs 103 and 104 are brought into contact with springs 105 and 106, respectively, and connection is established between the incoming line wires 107, 108 and the outgoing line wires 109, 110.

At the moment the connection just described is made the outgoing line shaft 102 may be released and another shaft 102 displaced to prepare another outgoing line in condition for subsequent connection to any incoming line. The end 149 of the flexible arm 145 now fits snugly between the arm 146 and the head 152 of the contact set, and is held there by the recessed arm 146 after the shaft 102 is restored. In this manner the contact set is maintained operated merely by the continued displacement of the incoming line shaft 101. It will be noted also that while the incoming line shaft is displaced the subsequent displacement of any outgoing line shaft 102 will not result in the operation of the contact set located at the intersection of those shafts, for the reason that the end 149 of the flexible arms 145 will not enter between the arm 146 and the head 152, but will strike the edge of the arm 146 and be held in that position until the line shaft 101 is restored.

*The system.*

The system of call distributing, as illustrated in Figs. 1, 2 and 3, will now be described, assuming, for example, that subscriber whose line number is 3485 is calling. Portions of the recorder are represented in Fig. 2, in a manner to facilitate the description of the system rather than to indicate the structural features. The recorder is ready to receive the record of the calling line number at some one of its idle sections, and the preselection of a recorder section determines which of the operators will receive the next subscriber's call. The position of pin 193 of the disk 59 of the spring motor 23 determines the position of the brush 516 which now is in contact with one of the six contact springs 512. A circuit is therefore closed while the apparatus is at rest for the corresponding one of the outgoing line magnets 170 (of which there would likewise be six) of an automatic switch 171 (Fig. 1), as follows:—from grounded battery 519 (Fig. 2), brush 518, contact ring 517, brush 516, spring 512, spring 511, wire 215 (Figs. 2, 3 and 1), and magnet 170 to ground. This magnet 170 corresponds in every respect to the magnet 118 shown in Fig. 14. Being thus energized it prepares the automatic switch 171 for instant connection of any one of the incoming lines on which a call should appear, such as the line 109, 110, to the preselected outgoing line 301, 302, leading to an idle operator's telephone equipment (Fig. 3).

In each of the other five positions of the spring motor 23 the brush 516 would be resting on some other spring 512 and a circuit similar to the one previously traced would be closed to some other magnet 170 of the switch 171, and thus preselect other line conductors like 301, 302, leading to another idle operator's telephone equipment.

There are shown in Fig. 1 two automatic switches, the switch 171 just referred to and another one, 172, associated more directly with the subscribers' lines. This switch 172 is likewise prepared for operation, *i. e.* preselected by the normal energization through a branch of an extended starter wire of one of its outgoing line magnets 118. This magnet receives current in the following circuit:—from grounded battery 173, back contact 174 of an incoming line magnet 175 of the switch 171, and magnet 118 to ground.

Switch 172 is thus prepared for connecting any one of a number of calling subscribers' lines, such as line 176, 177, to the outgoing line conductors 109, 110 leading to switch 171. The extended starter wire system, it will be noted, leads from the battery 173 to the front contacts of all of the magnets 175 in a row beginning with the one nearest to the battery when they are jointly energized, and finally through the back contact of the first idle magnet to the corresponding outgoing magnet 118 of the switch 172.

Assuming that the subscriber at station 178, whose line number, as previously assumed, is 3485, is calling. This subscriber initiates a call in the usual way by lifting his receiver from the switchhook and by closing a circuit as follows: from grounded battery 179 to winding 180 of an incoming line, magnet 117 of the switch 172, back contact 181 of the line cutoff relay 182, line wire 177, the telephone apparatus and switchhook, contact 199 at substation 178, line wire 176, back contact 183 of the cutoff relay 182, conductor 107, and a second winding 184 of the magnet 117 to ground. This magnet 117 being energized operates the set of contact springs 103, 104, 105, 106 located at the intersection of the two rocking shafts 101 and 102 (see Fig. 14) controlled by the magnets 117 and 118, respectively. This extends the subscriber's line circuit to conductors 109 and 110 and brings the incoming line magnets 175 of the switch 171 into bridge of the calling line, the complete circuit through this magnet at this time being from grounded battery 179, through winding 180, back contacts 181 and 185 of the cutoff relay 182, conductor 108, contact springs 104 and 106, conductor 110, magnet 175, conductor 109, contact springs 105 and 103, conductor 107, and winding 184 to ground. Magnet 175 is therefore immediately energized upon the operation of the switch 172, and the line circuit is extended to conductors 301 and 302 by way of the contact set 186, 187, 188, 189 of switch 171, bringing into the line circuit a second bridge through the signal relay 303, the complete circuit for this relay being over the same circuit, just previously described, except that it is now extended in shunt of magnet 175, from conductor 110, through springs 186 and 188, conductor 301, winding 304 of the repeating coil 305, relay 303, winding 306 of the repeating coil, conductor 302, springs 189 and 187 to conductor 109. The automatic switches 172 and 171 it is thus noted are maintained actuated by the energization of their incoming line magnets 117 and 175. The outgoing line magnets 118 and 170, however, immediately become de-energized, the former by reason of the opening of back contact 174 of magnet 175, and the latter by the shifting of the commutator brush 516 of the recorder in a manner to be presently stated. It is furthermore to be noted that magnets 117, 175 and relay 303 are now maintained energized independent of control by the subscriber, who although he may now hang up his telephone, cannot by that act break down the circuit established through the switches 172 and 171.

Relay 303 becoming energized in the circuit just traced closes a circuit from battery 307, through a call signal lamp 308 which attracts the attention of the operator. This relay also closes to battery 307 a conductor 216 connected to spring 201, thus preparing for subsequent closure a circuit to be presently traced through springs 201 and 202.

The calling subscriber may without waiting for the usual "Number please", announce to the waiting operator the number of the subscriber's line wanted. The operator's telephone 309 is inductively connected through back contacts 311 and 312 of a relay 313, and windings 314 and 315 of the repeating coil 305 with the circuit of conductors 301 and 302, and therefore with the telephone of the calling subscriber.

At the same moment that the calling line is thus switched to an idle operator's equipment, the recording of the number of the calling line takes place as follows: Each of the forty magnets 21 is connected by a wire, such as the wire designated 3000 (Figs. 1 and 2) to contacts of certain of the magnets 117 associated with the calling lines. For example, magnet "0" of the "thousands" division is connected to the springs 163 of all of the magnets 117 associated with lines from numbers 0000 to 0999. Likewise magnet "3" of the same division would be connected to springs 163 of all of the magnets 117 of lines from numbers 3000 to 3999. That is to say, each of the magnets 21 (individually numbered "0" to "9") in the "thousands" division of the recorder is connected to springs 163 of all of the magnets 117 associated with those lines, the thousands numeral of whose number is the same as the individual number of the magnet. Similarly the magnet "4" of the "hundreds" division of the recorder is connected to the springs 161 of all of the magnets 117 associated with those lines whose hundreds numeral is "4". In the same way the magnet "8" of the "tens" division is connected to springs 160 of all of those lines, the "tens" numerals of which is "8". And the magnet "5" of the "units" division is connected with springs 158 of all of those lines, the "units" numeral of which is "5". There is thus required in accordance with this invention, for recording calling line numbers in an exchange of 10,000 lines, only forty recording wires leading from contacts of the line magnets to the forty recording magnets. It will be seen at once that in such a system each of these recording wires would be multipled to 1000 line magnets. In a 5,000 line system the numbers of which run from 0000 to 4999 there would be required only 5 recording wires in the "thousands" division, and thus only 35 such wires in all (as indicated in Fig. 1).

The operation of the switches 172 and 171 to connect a calling line to an idle operator's equipment has been described and in this connection it remains to be stated just how the record is made of the number of that line. As previously stated, the magnet 117 is energized when the subscriber calls and connects the two sides of the calling line to the conductors 109, 110. This magnet also controls the contact set for producing momentary or "pass by" contacts in two recording circuits as follows: (one) from grounded battery 214 (Fig. 2), relay 217, common wire 218 (branching to each of the ten magnets 21 in the thousands division of the recorder), No. 3 of the magnets 21 in that division, recording wire No. 3000 (Figs. 2 and 1), contacts 163, 162 and 161 of magnet 117, recording wire No. 400 (Figs. 1 and 2), No. 4 of the magnets 21 in the hundreds division of the recorder and common wire 219 to ground; (two) from grounded battery 214ª (Fig. 2), common wire 222, No. 8 of the magnets 21 in the tens division, recording wire No. 80 (Figs. 2 and 1), contacts 160, 159 and 158 of the magnet 117, recording wire No. 5, No. 5 of the magnets 21 in the units division and common wire 223 to ground.

Four recording magnets 21 are thus energized momentarily and four of the levers 38 are displaced in that section of the recorder which corresponds to the preselected operator's position. These levers instantly establish a record of the subscriber's line number—3485—and although the recorder mechanism is immediately shifted to prepare for the next call, this record remains and is taken note of in a manner to be presently explained. At the same instant that the four recording magnets 21 are energized, the relay 217 is energized and momentarily closes a circuit for a relay 224 from grounded battery 214, contact 225 of relay 217, brush 212, contact ring 209, brush 208, springs 204, 203, relay 224 and contact springs 520, 521 to ground. Relay 224 thereupon closes a locking circuit for itself and for another relay 226 as follows: from grounded battery 227, relay 226, contact 228 of relay 224, relay 224 and springs 520, 521 to ground. Relay 226 is now energized; it has two sets of normally open contacts 229 and 231, each of which performs a distinct function. Contact 229 closes a circuit for the recorder-shifting magnet 22 and a retaining magnet 232 of a number indicator 233, the circuit being from grounded battery 227, contact 229, conductor 234, magnet 232, conductor 235 and magnet 22 to ground. The energization of magnet 22 withdraws the stop lever 97 from the pin 193 and allows the spring motor 23 to drive the recorder mechanism into position to take the next incoming call in its next idle section. The spring motor 23 is driven as stated by the stepping magnet 24, which receives impulses from a constantly rotating interrupter 523 whenever a circuit connection is established between ring 61 and brush 73, such a circuit being completed as follows: from grounded battery 524, interrupter 523, brush 63, ring 61, brush 73, ring 71, lead 525, magnet 24 and ground at 527. The energization of the magnet 232 prepares the number indicator for registering the number just recorded by the displaced levers. Contact 229 also closes a circuit for the retaining magnets 26 of the recorder from point 271 through branches 272, magnets 26, and ground at 522. The energization of magnets 26 prepares the recorder in the section where the record is established for the registration thereof by stepping magnets 25. The closing of contact 231 by relay 226 starts or prepares to start an interrupter system for advancing step by step the recorder arms 89 in the selected section and the indicator 233 in step therewith. The arms 89 hunt for the displaced levers and the indicator dials advance to positions which correspond to the positions of the arms when they engage the displaced levers.

The indicator may be any form of number registering device. As illustrated in Fig. 2 the indicator 233 may comprise a box frame 236, part of which is shown at the right end, the remainder being broken away to display the internal mechanism. Dotted lines indicate the general contour of this frame. The top or front face of it has four windows 237, 238, 239 and 241 through which the thousands, hundreds, tens and units numerals of the subscriber's number may be displayed. Four numeral disks 242, 243, 244 and 245, semi-circular in shape and each showing along their peripheries the numerals 0 to 9, are fixed to spindles 246 and are adapted to be stepped around to display the numerals successively through the windows by means of the ratchet wheels 247 and stepping magnets 248, 249, 251 and 252. The retaining magnet 232 controls by means of a rod 253 a system of levers for retaining when the magnet is energized the ratchets and numeral disks in their advanced positions. Associated with the stepping magnets of the number indicator 233 are cutoff relays 254 adapted, when the corresponding arms 89 of the recorder engage the displaced levers, to open and hold open the circuits of the indicator stepping magnets. These cutoff relays are slow to release so as to remain energized in a circuit which is intermittently closed.

It has been noted that contact 231 of relay 226 is closed. In circuit with this contact is one of the alternate contacts 257 of a continuously operated reed or interrupter 258. The opposite contact 259 is in series with a contact 261 of a locking relay 262. This arrangement is one adapted to "time" the closing of the stepping circuit for the recorder and indicator stepping magnets so as to insure a full first impulse. The interrupter 258 must first close at contact 257 a circuit for the relay 262 as follows: from grounded battery 263, reed 258, contact 257, contact 231, a contact 264 of relay 262, relay 262 and contacts 520, 521 of the recorder. Relay 262 thereupon closes a locking circuit for itself, from grounded battery 263, another contact 265 of relay 262, relay 262, and contacts 520, 521 to ground; and also closes contact 261 which prepares the stepping circuit at that point. The interrupter now sends a succession of impulses to the several branches of the stepping circuit. This circuit is from grounded battery 263, reed 258, contact 259, contact 261, to a point 266, from which it branches to the stepping magnets of the several divisions, one of these branches being from the point 266 to stepping magnet 25 of the thousands division, conductor 267, contact 268 of cutoff relay 254 and stepping magnet 248 of the indicator 233 to ground. The other branches may be readily traced in like manner. When the arm 89, say of the thousands division, reaches the displaced lever 38 (No. 3 in this case), four impulses will have been sent and at this moment the spring 92 engages the spring 91, closing a circuit for the cutoff relay 254 from grounded battery 263, reed 258, contact 259, contact 261, magnet 25, spring 92, spring 91 and relay 254 to ground. Relay 254 now opens at contact 268 the branch through magnet 248 and closes the branch again at contact 269 so that the impulses are continued in that branch through the stepping magnet 25 and the cutoff relay 254, while the indicator disk 242 remains in its advanced position showing the thousands numeral "3" through the window 237. In a similar manner the other disks 243, 244 and 245 are adjusted to show the numerals "4", "8" and "5" through the windows 238, 239 and 241, respectively. The whole number 3485 of the calling subscriber is now displayed. When eleven impulses have been sent in the stepping circuit the arm 89 of the recorder (thousands division) engages the spring 520 causing the latter to break contact with spring 521. This opens the locking circuits of relays 224, 226 and 262 and restores their contacts to normal positions. The opening of contact 229 of relay 226 does not, however, cause the deënergization of magnets 22, 232 and 26 as these are now included in a locking circuit controlled by magnet 22 as follows: grounded battery 307 (Fig. 3), contact 316 of relay 303, conductor 216 (Figs. 3 and 2), springs 201 and 202 (held in contact by the action of magnet 22), conductor 234, retaining magnet 232 of the indicator 233, conductor 235 and magnet 22 to ground. A branch of this circuit from point 271, through conductors 272 maintains the retaining magnets 26 energized.

The operation up to this point takes place in a very brief interval following the removal of the subscriber's receiver to call. Almost instantly the subscriber's line had been connected by the switches 172 and 171 in circuit with the operator's equipment and simultaneously therewith the record of the calling subscriber's line number had been established in a certain section of the recorder—the one assigned to that operator's position. Following these operations, the impulses—eleven in number—are sent locally to the indicator 233, this operation taking place within a fraction of a second. The indicator 233 is located at the operator's position to whose equipment the calling line is connected so that she knows at a glance what line is calling.

The calling subscriber immediately after lifting his receiver may dictate to the waiting operator the number of the subscriber's line wanted. At the same time the operator, noting the number displayed at the indicator, may pick up an answering plug 317 of an idle cord circuit at her position and insert it in the multiple jack 318 (shown in both Figs. 3 and 1) of that line, thus establishing a direct circuit with the calling line and restoring the apparatus previously operated. The circuit changes which take place are as follows: It will be noted first that a circuit is established for the line cutoff relay 182 (Fig. 1) from grounded battery 321 (Fig. 3), relay 322, supervisory lamp 323, sleeve 324 of the plug 317, sleeve 325 of the jack 318, cutoff relay 182 and resistance 198 to ground. The operation of the cutoff relay 182 causes the restoration of line switches 172 and 171 by disconnecting battery 179 and the bridge through windings 180 and 184 of the magnet 117 from the subscriber's line, and likewise causes the relay 303 (Fig. 3) to be restored. The latter opens at contacts 316 the locking circuit for the magnets 22, 232 and 26 permitting the arms 89 of the recorder, the numeral disks of the indicator 233 and the arm 97 to be restored. The arms 89 of the recorder in moving back to their normal position restore the displaced levers 38 in the manner heretofore explained. This section of the recorder is therefore now free to be used for the registration of another call and the pin 193 will, when again advanced to that position, be stopped by the corresponding arm 97.

The operation of relay 322 and the restoration of relay 303 result in a circuit being closed for the operation of the listening key 319 as follows: from grounded battery 307, through contact 358 of relay 303, contact 359 of relay 322, contact 361 of relay 362 and magnet 363 of the listening key 319 to ground. The operation of the listening key is thus automatically brought about by the insertion of the plug 317 in the multiple jack 318 of the calling line. A circuit is now closed for the relay 313 from grounded battery 326, conductor 327, contact 328 of the listening key 319, conductor 329, and relay 313 to ground. This relay 313 now opens contacts 311 and 312 disconnecting the operator's telephone set 309 from the secondary windings 314 and 315 of the repeating coil 305 and connecting it in bridge of the cord circuit as follows: from the point 331, contact 332 of the listening key 319, conductor 334, contact 335 of relay 313, the operator's telephone set 309, contact 336 of relay 313, conductor 337 and contact 338 of the listening key to point 339 of the cord circuit.

The operator now proceeds to complete the connection desired by inserting the calling plug 341 in the multiple jack of the subscriber wanted and signals that subscriber by depressing the ringing key 342. The insertion of the plug 341 closes a circuit for the cutoff relay of the called line like that previously traced to the cutoff relay 182 of the calling line and causes the energization of relay 362 which opens at contact 361 the circuit of the listening key actuating magnet 363 and restores the operator's telephone to its normal connection with the secondary windings 314 and 315 of the repeating coil 305. When the subscribers are through talking and hang up their telephone receivers, the supervisory lamps 323 and 343 are lighted whereupon the operator may disconnect in the usual way by removing the plugs.

The busy test is established for the calling line before the operator plugs in the multiple jack. This is provided for the moment the receiver is lifted by the following circuit established by the operation of the line switch magnet 117: from grounded battery 179 (Fig. 1) resistance 197, contacts 164 and 165 of relay 117 and resistance 198 to ground. This raises the potential of the test sleeves of the multiple jack of that line and warns the operators when testing the line of its busy condition.

The talking circuit established between the calling subscriber and the operator through the switches 172 and 171, may be traced by reference to Figs. 1, 2 and 3, and is shown in the simplified diagram Fig. 15. It is as follows: from the subscriber's switchhook contact 199, through the telephone set 178, line wire 176, resistance 196, contact 183 of cutoff relay 182, conductor 107, line switch contacts 103, 105, conductor 109, line switch contacts 187, 189, conductor 302, repeating coil winding 306, condenser 194, repeating coil winding 304, conductor 301, line switch contacts 188, 186, conductor 110, line switch contacts 106, 104, conductor 108, contact 185 of cutoff relay 182, resistance 195 and line wire 177 to contact 199. Across this talking circuit are two bridges: one including the winding 184 of line switch magnet 117, battery 179, the winding 180 of magnet 117 and contact 181 of cutoff relay 182; the other including the winding of line switch magnet 175. The operator's telephone is inductively associated with this circuit by the repeating coil 305.

Figure 16:
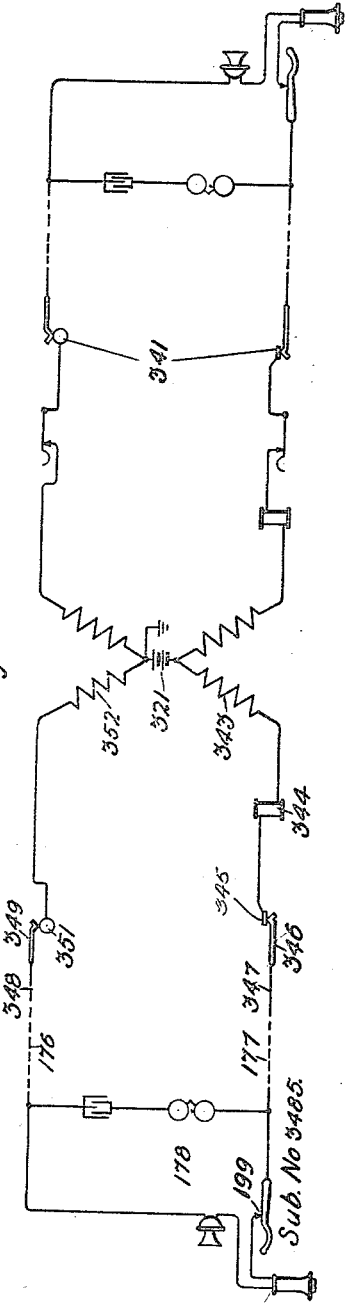

The talking circuit between subscribers may be traced in part in Figs. 1, 2 and 3, and in whole in the simplified diagram, Fig. 16, as follows: for the calling subscriber from grounded battery 321, winding 343 of the cord circuit repeating coil, supervisory relay 344, ring contact 345 of plug 317, ring contact 346 of jack 318, conductor 347, line wire 177, switchhook contact 199, subscriber's set 178, line wire 176, conductor 348, tip contact 349 of jack 318, tip contact 351 of plug 317 and winding 352 of repeating coil to ground. The circuit to the called subscriber is the same except that the connection is made through the plug 341 and jack of the called line.

Whenever the operator has occasion to supervise a connection she may create a busy condition of her equipment to incoming calls by the act of listening in at any cord circuit on her position. In order to do this either one or the other or both of the plugs of a cord circuit must be in a subscriber's jack, and under such a condition and provided also the operator has not at the moment received a call, the operator may close circuit for magnet 363 by pressing button 364, as follows: from grounded battery 307, through contact 358, contact 365 of relay 322 or contact 366 of relay 362 (or both), button switch 364 to magnet 363 and ground.

Whenever the listening key 319 is thus or in any manner operated, a circuit is established for the relay 313 as heretofore traced. This relay controls a contact 354 in the circuit of the magnet 22 as follows: from battery 355, through resistance 356, contact 354, conductor 273, conductor 235, and magnet 22 to ground. As long as the listening key is held depressed this circuit will maintain the magnet 22 energized and therefore the lever 97 removed from the path of the pin 193 of the spring motor 23. Therefore the recorder cannot during such period be arrested in position to transfer a call to that operator's position. Releasing the listening key allows the lever 97 to drop back into normal position and thereafter the spring motor 23 will stop the recorder, in turn, at the particular section thereof which corresponds to that operator's position.

A condition may arise in which the subscriber will hang up his telephone without waiting for the operator to establish a talking circuit in the multiple jacks. In such case the operator may release the connection established through the switches 172 and 171 simply by momentarily depressing a special key 357 which short circuits the windings 180 and 184 of the line switch magnet 117. Contact 367 of this key when closed short circuits the winding 184 while contact 368 short circuits winding 180 (see Fig. 15). The resistances 195 and 196 are inserted in the line to insure release by the key 357 even in case the line outside is short-circuited. The line switch 172 being restored in this manner, the subscriber's line is cut off from the circuit at once. Line switch 171 is held closed until the key 357 is released. While key 357 is depressed it is desirable to maintain the operator's position busy and to that end a contact 369 controlled by the key is wired in shunt of contact 354 of relay 313 and performs the same function—i. e. to close a circuit for magnet 22.

In Fig. 4 is illustrated a modified arrangement of circuits for connecting subscribers' lines to idle operators. In this arrangement line relays, one for each of a group of lines, associated with an instruction circuit are substituted for the line switch 172 in Fig. 1. This arrangement is in some respects like that illustrated and claimed in my Patent #1,163,953, issued December 14, 1915. Also a somewhat different method than that of Fig. 1 of producing momentary recording impulses is provided in Fig. 4, and the circuit is so constructed that only one subscriber at a time in a group can have access to the instruction circuit. More in detail there is provided a line relay 401 having windings 402 and 403 connected in circuit similarly to relay 117 of Fig. 1; and a recording impulse relay 404. In addition to these two each line is provided with a cutoff relay 182 as in Fig. 1. There is provided for the common use of a group of subscribers' lines (say, twenty-five) an instruction circuit comprising the conductors 405 and 406, two local wires 407 and 408 associated therewith and a guard relay 409.

The operation of the system of Fig. 4 is as follows: Normally relay 404 is in circuit with the subscriber's line and is energized momentarily when the subscriber lifts his receiver to call, the circuit being from grounded battery 179, through contact 411 of relay 409 (provided that relay is not energized), relay 404, contact 412 of relay 401, contact 185 of cutoff relay 182, resistance 195, line wire 177, hook switch 199, subscriber's set 178, line wire 176, resistance 196, contact 183 of cutoff relay 182 and contact 413 of relay 401 to ground. This relay 404 thereupon closes the impulse circuits at contacts 415 and 416 which energize the recording magnets 21 in the same way as the circuits of Fig. 1 when closed by the contacts of magnet 117. Relay 404 also closes at contact 417 a circuit for relay 401 to line, bringing the winding 402 thereof in shunt of the winding of relay 404, the shunt path being from grounded battery 418, through contact 417 of relay 404, contact 419 of relay 401, winding 402 of relay 401, to contact 181 of cutoff relay 182. Relay 401 on being energized opens the circuit of relay 404 and closes its own circuit to line as follows: From grounded battery 179, through guard relay 409, contact 421 of relay 401, winding 402 of relay 401, contact 181 of cutoff relay 182, line and subscriber's set as before, contact 183 of cutoff relay 182 and winding 403 of relay 401 to ground. At the same time relay 401 extends the subscriber's line circuit to the instruction circuit 405, 406, through contacts 422 and 423. The operation of the line switch 171 follows just as in the system of Fig. 1. Also the restoration of the circuit thus established, either by the operation of the cutoff relay 182 when the operator plugs into the multiple, or by the short-circuiting of the windings of relay 401 in case the operator depresses the special key 357 (Fig. 3), is effected in substantially the same way. It will be noted that any subscriber of a group who attempts to call while the instruction circuit 405, 406 is engaged will be required to wait because the battery 179 is temporarily disconnected at contact 411 from the common wire 407 which feeds current to the impulse relays 404. This wait, however, need be but a short one in any case because the instruction circuit is not intended for extended use by the subscriber.

In the circuit diagrams the conventional symbol for a battery is shown in various places as a matter of convenience, and it is understood that one battery may, and in practice ordinarily would serve as a general source of current for the various circuits. It is also understood that the invention is not limited in its broadest sense to manual means for completing the telephonic circuits between subscribers, by reason of the showing in Fig. 3 of plug circuits and subscribers' spring jacks for that purpose.

What is claimed is:

1. A recording mechanism comprising sections with a plurality of recording members in each section and a plurality of actuating devices operatively associated in succession with corresponding members in the several sections.

2. A recording mechanism comprising sections with a plurality of recording members in each section, a plurality of actuating devices for said members and common to the several sections, and means for shifting the control of said actuating devices from one section to another.

3. A recording mechanism comprising sections each adapted to receive and record numeral registrations at a plurality of points, a recording member at each of said points in each section, a plurality of actuating devices, one for each of said members in one section and the corresponding members in the other sections, said actuating devices being operatively associated with the members in one section at a time, and means for shifting the control of said actuating devices from one section to another.

4. A recording mechanism comprising sections with a plurality of recording members in each section, a plurality of actuating devices for said members and common to the several sections, and means operating simultaneously on the actuating devices to shift their control from one section to another.

5. A recording mechanism comprising sections with a plurality of recording members in each section, a plurality of actuating devices operatively associated in succession with corresponding members in the several sections, and means associated with each section for locating an actuated member therein.

6. A recording mechanism comprising sections with a plurality of recording members in each section, a plurality of actuating devices operatively associated in succession with corresponding members in the several sections, and means associated with each section for locating and restoring the actuated member therein.

7. A recording mechanism comprising divisions and corresponding sections in each division with a plurality of recording members in each section and a plurality of actuating devices operatively associated with corresponding members in the several sections of one division, other actuating devices associated in like manner with the members in each of the other divisions, and means acting simultaneously on all of said actuating devices for shifting their control in each division from one section to another.

8. A recording mechanism comprising sections with a plurality of recording levers in each section, a plurality of actuating devices adapted to displace said levers and common to the several sections, means for shifting the control of said actuating devices from one section to another, and means associated with each section for locating the displaced lever.

9. A recording mechanism comprising sections with a plurality of recording levers in each section, a plurality of actuating rods for said levers and common to the several sections, spirally disposed pins on each of said rods, one pin for each section, each pin being adapted in one angular position of the rod to displace a recording lever in one section upon longitudinal movement of the rod, and means operating simultaneously on all of the actuating rods, whereby the rods are moved angularly to shift their control from one section to another.

10. A recording mechanism comprising sections with a plurality of recording members in each section, a plurality of actuating devices for said members and common to the several sections, means for moving any one of said actuating devices to displace a recording member in one of the sections, and means operating simultaneously upon all of the actuating devices to shift their control from that section to another.

11. A recording mechanism comprising sections with a plurality of recording members in each section, a plurality of actuating rods for said members and common to the several sections, spirally disposed pins on each of said rods, each of said pins being adapted in one angular position of its rod to displace a recording member in one section upon longitudinal movement of the rod, a pinion for each rod and a gear operated simultaneously on all of the pinions to shift the control of the actuating rods from one section to another.

12. A recording mechanism comprising sections, a plurality of recording members in each section, a plurality of actuating devices for said members and common to the several sections, a spring motor operatively associated with all of said actuating devices, a plurality of stops for said motor, one stop for each section, and means for moving said stops whereby said spring motor acts simultaneously to shift the control of said actuating devices from one section to another.

13. In a call recording system, the combination with a mechanism comprising sections with a plurality of recording members in each section and a plurality of actuating devices operatively associated with corresponding members in the several sections, of means for operating any one of said actuating devices to record a call in one section, and means automatically responsive to the recording of each call to shift the control of the actuating devices to another section.

14. In a call recording system, the combination with a mechanism comprising sections, a plurality of recording members in each section and a plurality of actuating devices operatively associated with the corresponding members in the several sections, of means for operating any one of said actuating devices to record a call in one section, means for shifting the control of the actuating devices from section to section as the calls are received, a register for each section, and means for transferring a record in any section to the corresponding register.

In witness whereof, I hereunto subscribe my name this 28th day of December, A. D. 1916.

JOHN G. ROBERTS.

Copies of this patent may be obtained for five cents each, by addressing the "Commissioner of Patents, Washington, D. C."